F. Bauschtliker,
Drag Saw.
No 82,789.   Patented Oct. 6, 1868
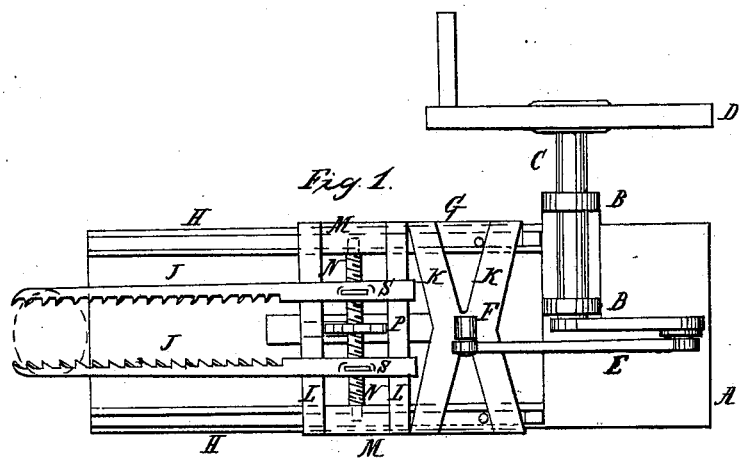
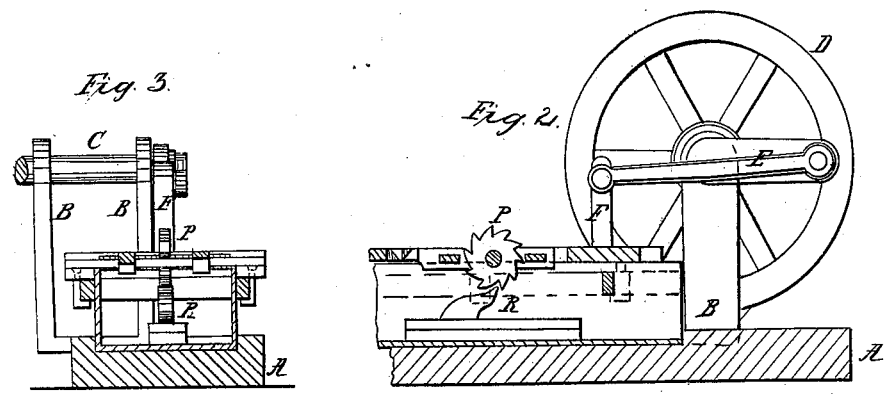
Witnesses:
C. D. Mayhew
Thomas Cummings
Inventor:
Frederick Bauschtliker
By his Atty
J. F. Reigart

United States Patent Office.

FREDERICK BAUSCHTLIKER, OF WASHINGTON, DISTRICT OF COLUMBIA, ASSIGNOR TO HIMSELF AND FREDERICK GENTNER, OF SAME PLACE.

*Letters Patent No. 82,789, dated October 6, 1868.*

IMPROVEMENT IN SAWS FOR FELLING TREES.

*The Schedule referred to in these Letters Patent and making part of the same.*

TO ALL WHOM IT MAY CONCERN:

Be it known that I, FREDERICK BAUSCHTLIKER, of Washington city, District of Columbia, have invented a Double-Bladed Saw for Cutting Trees; and I hereby declare the following to be an exact description thereof, reference being had to the accompanying drawings, and to the letters of reference marked thereon, making a part of this specification, in which—

Figure 1 represents a top view of the sawing-machine.

Figure 2 is a side view of the same.

Figure 3 is a cross-section.

The nature of my invention consists in the arrangement and combination of a double saw, operating on a right and left-hand screw, with a ratchet-wheel upon the screw, that is operated by a dog underneath.

A is a platform, that supports the devices of the machine.

B B are two posts, erected upon the platform A, that supports a shaft, C, upon one end of which is a fly or main driving-wheel, D, and at the other end of the shaft is attached a crank and pitman, E, that is attached to an upright post, F, that is located at the centre of the movable frame G, and working upon guides H H, by means of which the saws J J are carried back and forward, for the purpose of cutting trees.

The frame G is braced by two angular cross-pieces, K K, and two horizontal cross-pieces, L L, the side pieces M M sliding upon the guides H H.

A right and left-hand screw, N, revolves in the side pieces, M, of the movable frame G, and has a ratchet-wheel, P, permanently attached to the centre of the screw N.

A permanent upright dog, R, is located and fastened to the centre of the frame A, so that the ratchet P is brought in contact with it at each forward movement of the saws.

The saws J J operate on the screw N, so as to close or feed them into the trunk of the tree as it is being cut, one of the saw-blades, J, being thicker than the other, so as to make a wider cut on one side of the tree than the other, that the tree may fall more certainly on that side. The saw-cut is also made straight and even on the upper side, thus saving much of the timber, and as the saws advance or close, wedges are inserted, to keep the cuts free for saws. After the saws are withdrawn, they are opened again for another operation, by the use of a crank or lever, S, to reverse the revolution of the screws J.

What I claim as my invention, and desire to secure by Letters Patent, is—

The double-bladed saws J J, screw N, ratchet P, and movable frame G, when arranged, combined, and operated as herein described, and for the purpose set forth.

FRDRCK. BAUSCHTLIKER.

Witnesses:
E. D. MAYHEW,
J. FRANKLIN REIGART,
EDM. F. BROWN.